United States Patent
Koch et al.

(10) Patent No.: US 7,848,343 B2
(45) Date of Patent: Dec. 7, 2010

(54) TRAFFIC MANAGEMENT FOR A PASSIVE OPTICAL NETWORK TERMINAL

(75) Inventors: Christopher D. Koch, Minneapolis, MN (US); David Cleary, Bloomington, MN (US)

(73) Assignee: Calix, Inc., Petaluma, CA (US)

( * ) Notice: Subject to any disclaimer, the term of this patent is extended or adjusted under 35 U.S.C. 154(b) by 1562 days.

(21) Appl. No.: 11/157,438

(22) Filed: Jun. 21, 2005

(65) Prior Publication Data
US 2006/0013247 A1  Jan. 19, 2006

Related U.S. Application Data

(60) Provisional application No. 60/588,214, filed on Jul. 15, 2004.

(51) Int. Cl.
*H04J 3/16* (2006.01)
(52) U.S. Cl. .............. 370/437; 370/232; 370/234; 370/235
(58) Field of Classification Search .......... 370/229, 370/230, 232, 236, 392, 437, 465; 389/63
See application file for complete search history.

(56) References Cited

U.S. PATENT DOCUMENTS

| | | | |
|---|---|---|---|
| 6,529,475 B1 * | 3/2003 | Wan et al. | 370/231 |
| 6,738,350 B1 | 5/2004 | Gao et al. | |
| 7,245,621 B2 * | 7/2007 | Sala et al. | 370/392 |
| 7,289,501 B2 | 10/2007 | Davis | |
| 7,301,906 B2 * | 11/2007 | Nation et al. | 370/235 |
| 2003/0086140 A1 | 5/2003 | Thomas et al. | |
| 2004/0223497 A1 * | 11/2004 | Sanderson et al. | 370/395.52 |

OTHER PUBLICATIONS

Office Action for U.S. Appl. No. 11/157,226, mailed Jun. 11, 2009, 9 pages.
Response to Office Action for U.S. Appl. No. 11/157,226, filed Aug. 14, 2009, 11 pages.
Norman Finn, "Compatability Model for IEEE 802.3ah EPONs," IEEE 802, Rev. 5, Jun. 28, 2002, 13 pages.
Office Action for U.S. Appl. No. 11/157,226, mailed Nov. 26, 2008, 30 pages.
Response to Office Action for U.S. Appl. No. 11/157,226, filed Feb. 26, 2009, 8 pages.

(Continued)

*Primary Examiner*—Chi H Pham
*Assistant Examiner*—Kouroush Mohebbi
(74) *Attorney, Agent, or Firm*—Shumaker & Sieffert, P.A.

(57) ABSTRACT

Techniques are described for managing traffic flow to an optical network terminal (ONT) on a passive optical network (PON) to prevent an individual ONT from being overrun. Specifically, the techniques involve reducing a transmission rate of a unique traffic flow and selectively denying access to a common traffic flow. By reducing the transmission rate of the unique traffic flow, sufficient bandwidth may be released to receive the unique traffic flow and the common traffic flow without overflowing the ONT. For example, the ONT or, alternatively, the OLT may send the requested common traffic flow without reducing the transmission rate of the unique traffic flow when sufficient bandwidth is available, send the common traffic flow but reduce the transmission rate of unique traffic flow by an appropriate amount, or deny access to the common traffic flow altogether without reducing the transmission rate of the unique traffic flow.

11 Claims, 8 Drawing Sheets

OTHER PUBLICATIONS

Notification of Transmittal of the International Preliminary Report on Patentability for corresponding International Application No. PCT/US2005/022155, dated Jul. 24, 2006, 11 pages.

Notification of Transmittal of the International Search Report and the Written Opinion of the International Searching Authority for patent application No. PCT/US2005/022155, dated Sep. 9, 2005, (8 pages).

* cited by examiner

TRAFFIC MANAGEMENT FOR A PASSIVE OPTICAL NETWORK TERMINAL

This application claims the benefit of U.S. provisional application No. 60/588,214, filed Jul. 15, 2004, the entire contents of which is incorporated herein by reference.

TECHNICAL FIELD

The invention relates to computer networking and, more particularly, to the management of traffic to an optical network terminal (ONT) on a passive optical network (PON).

BACKGROUND

A passive optical network (PON) can deliver voice, video and other data among multiple network nodes, often referred to as optical network terminals (ONTs), using a common optical fiber link. Passive optical splitters and combiners enable multiple ONTs to share the optical fiber link. Each ONT terminates the optical fiber link for a residential or business subscriber, and is sometimes referred to as a subscriber premises node. Each ONT is connected to one or more subscriber devices, which ultimately receive the voice, video and other data delivered via the PON.

Generally, a PON includes a PON interface, sometimes referred to as an optical line terminator (OLT), having multiple, independent PON interface modules that serve multiple optical fiber links. A PON interface module provides an interface for transmission and reception of data packets over a particular optical fiber link that serves a group of ONTs. A PON is inherently a downstream-multicast medium. Each packet transmitted on an optical fiber link can be received by every ONT served by that link. ONTs identify selected packets on the fiber link based on addressing information included within the packets.

An ONT on a PON may receive traffic from several sources. Some sources may be commonly used among several ONTs on a PON. For example, several ONTs may access a common traffic flow associated with switched digital video (SDV) or other multicast streams. Other sources may produce traffic flows that are unique to an individual ONT. For example, an individual ONT may receive web content from an Internet service provider (ISP) or voice data from the public switched telephone network (PSTN).

ONTs generally receive common traffic flows at a common transmission rate. However, the bandwidth capacity of the ONT may limit throughput of the ONT, e.g., to 100 mega-bits per second (Mbps). Consequently, access to two or more traffic flows may exceed the bandwidth capacity of a given ONT, causing the ONT to be overrun.

SUMMARY

In general, the invention is directed to techniques for managing traffic flow to an optical network terminal (ONT) on a passive optical network (PON). The traffic management techniques are designed to meter the flow of traffic to an individual ONT to avoid overflow. In this manner, the traffic management techniques ensure that an individual ONT does not exceed its bandwidth capacity, thereby maintaining the ONT's ability to forward received packets to subscriber devices.

As described herein, the traffic management techniques may involve metering or reducing a transmission rate of a unique traffic flow or packet stream based on a bandwidth capacity of an ONT. The techniques may also include denying the ONT access to a second packet stream on the PON if the combined bandwidth requirement of the unique and second packet stream exceed the bandwidth capacity of the ONT. In this example, the second packet stream may be a common packet stream or a unique packet stream. As used herein, a common packet stream, such as multicast switched digital video (SDV), refers to a packet stream that is addressed to multiple ONTs on a PON. A unique packet stream refers to a packet stream that is addressed to an individual ONT, such as in the case of voice or Internet content. A unique packet stream is inherently multicast in a PON, but is addressed to only the particular ONT that requested the packet stream. The transmission rate of a unique packet stream can be metered or reduced based on the bandwidth capacity of an ONT. However, it is difficult to meter a common packet stream to accommodate the bandwidth capacity of an individual ONT.

In one example, a traffic management technique involves reducing a transmission rate of a unique packet stream in response to receiving a request. In particular, an ONT sends the request to an OLT to reduce the transmission rate of the unique packet stream in order to receive a second packet stream without overflowing the ONT, i.e., without exceeding the bandwidth capacity of the ONT. By reducing the transmission rate of the unique packet stream, sufficient bandwidth may be released, thereby allowing an ONT to access the unique packet stream and one or more other packet streams without overflowing the ONT. Specifically, the transmission rate of the unique packet stream may be reduced when the combined bandwidth requirement of the unique packet stream at a reduced transmission rate and a second packet stream would not exceed the bandwidth capacity of the ONT. The OLT sends the unique packet stream at a reduced transmission rate in response to receiving a request from the ONT. Thus, the ONT can admit the second packet stream and concurrently receive the unique packet stream at a reduced transmission rate without being overrun.

In another example, a traffic management technique involves receiving a unique packet stream and selectively denying access to a selected packet stream. In particular, denying access to the selected stream is based on determining whether receiving the unique packet stream and the selected packet stream would collectively exceed the bandwidth capacity of an ONT. The selected packet stream may be a common or a unique packet stream. In any case, when receiving the unique packet stream and the selected packet stream would collectively exceed the bandwidth capacity, the ONT may send a request to an OLT to reduce a transmission rate associated with the unique packet stream, as previously described, when receiving the unique packet stream at a reduced transmission rate and the selected packet stream would not collectively exceed the bandwidth capacity of the specific ONT. However, the ONT may deny access to the selected packet stream when receiving the unique packet stream at the reduced transmission rate and the selected packet stream would collectively exceed the bandwidth capacity of the specific ONT. When the selected packet stream is not accessed, the transmission rate of the unique packet stream is not reduced. Thus, a request is not sent to the OLT if a transmission rate reduction of the unique packet stream is not needed.

Additionally, the received unique packet stream may have a minimum transmission rate. Accordingly, the transmission rate of the unique packet stream cannot be reduced below the corresponding minimum transmission rate. Thus, the ONT may deny access to the selected packet stream when the transmission rate of the unique packet stream must be reduced below the minimum rate to accommodate both packet streams. Again, when the selected packet stream is not admitted, the transmission rate of the unique packet stream is not reduced and, thus, a request does not need to be sent to the OLT.

In an alternative example, a traffic management technique involves an OLT determining a policy for admission of a common packet stream requested by an ONT while the ONT is also receiving a unique packet stream, rather than the ONT determining a policy for admission of a packet stream. The ONT may select to receive the common packet stream by simply sending a request, such as an internet group management protocol (IGMPv2) join request, for a specific common packet stream. The OLT may store a bandwidth table that includes the bandwidths of each common packet streams that may be requested by an ONT. In this case, the OLT may interrogate the IGMPv2 join request and reference the bandwidth table to determine the admission policy, i.e., send the requested common packet stream without reducing the transmission rate of the unique packet stream when the combined bandwidth requirement of the packet streams would not exceed the bandwidth capacity of the ONT, send the requested common packet stream and reduce the transmission rate of the unique packet stream when receiving the requested common packet stream and the unique packet stream at the reduced transmission rate would not collectively exceed the bandwidth capacity of the ONT, and deny the ONT access to the requested common packet stream when receiving the requested common packet stream and the unique packet stream at the reduced transmission rate would collectively exceed the bandwidth requirement of the ONT. The OLT may also deny the ONT access to the requested common packet stream when the transmission rate of the unique packet stream must be reduced below a minimum transmission rate in order to prevent the ONT from being overrun. Thus, the traffic management techniques are implemented in the OLT rather than the ONT in this case. In any event, the traffic management techniques described herein cart prevent the ONT from being overrun by permitting or denying access to a selected packet stream while receiving a unique packet stream at a variable transmission rate.

In one embodiment, the invention is directed to a method comprising sending a first packet stream and a second packet stream over a PON, the first packet stream being addressed to a specific ONT on the PON, receiving a request from the specific ONT to reduce a transmission rate of the first packet stream when the first packet stream and the second packet stream collectively exceed a bandwidth capacity of the specific ONT, and reducing the transmission rate of the first packet stream in response to receiving the request.

In another embodiment, the invention is directed to a method comprising receiving a first packet stream and a second packet stream transmitted over a PON, the first packet stream being addressed to a specific a ONT and the second packet stream being addressed to a multicast group associated with a plurality of ONTs on the PON, sending a request to reduce a transmission rate of the first packet stream when receiving the first packet stream and the second packet stream collectively exceed a bandwidth capacity of the specific ONT, and receiving the first packet stream at a reduced transmission rate.

In another embodiment, the invention is directed a method comprising receiving a first packet stream transmitted over a PON to a specific ONT on the PON, selecting a second packet stream transmitted over the PON to each ONT on the PON, and determining whether receiving the first packet stream and the second packet stream would collectively exceed a bandwidth capacity of the specific ONT. When receiving the first packet stream and the second packet stream would collectively exceed the bandwidth capacity, the method further includes sending a request to reduce a transmission rate associated with the first packet stream when receiving the first packet stream at a reduced transmission rate and the second packet stream would not collectively exceed the bandwidth capacity of the specific ONT. Also, when receiving the first packet stream and the second packet stream would collectively exceed the bandwidth capacity, the method further includes denying access to the second packet stream when receiving the first packet stream at the reduced transmission rate and the second packet stream would collectively exceed the bandwidth capacity of the specific ONT.

In another embodiment, the invention is directed to an OLT for use on a PON comprising a unicast queue to send a stream of unicast packets to a specific optical network terminal (ONT) on the PON, a multicast queue to send a stream of multicast packets to each ONT on the PON, and a metering module to reduce a transmission rate associated with the stream of unicast packets in response to receiving a request from the specific ONT, wherein the metering module receives the request when the stream of unicast packets and the stream of multicast packets collectively exceed a bandwidth capacity of the specific ONT.

In another embodiment the invention is directed to an ONT for use on a PON comprising circuitry to receive a first packet stream and a second packet stream, the first packet stream being addressed to the ONT and the second packet stream being addressed to a multicast group associated with a plurality of ONTs on the PON, wherein the ONT is a member of the multicast group and an admission control module to send a request to an OLT on the PON to reduce a transmission rate of the first packet stream when receiving the first packet stream and the second packet stream would collectively exceed a bandwidth capacity of the ONT.

In yet another embodiment, the invention is directed to a PON comprising an OLT to send a stream of unicast packets to a specific ONT on the PON and a stream of multicast packets to each ONT on the PON, and an ONT to receive the stream of unicast packets and the stream of multicast packets, wherein the OLT reduces a transmission rate of the stream of unicast packets in response to receiving a request to reduce the transmission rate from the ONT when receiving the stream of unicast packets and the stream of multicast packets would collectively exceed a bandwidth capacity of the ONT, and wherein the ONT denies access to the stream of multicast packets when receiving the stream of unicast packets at a reduced transmission rate and receiving the stream of multicast packets would exceed the bandwidth capacity of the ONT.

The invention also contemplates computer readable media storing instructions for implementing such methods. The methods can be embodied in a variety of ONTs and OLTs that may include one or more processors, e.g., one or more microprocessors, digital signal processors (DSPs), application specific integrated circuits (ASICs), field-programmable gate arrays (FPGAs), or other programmable logic circuitry, firmware and/or software for implementing the methods. If implemented in software, a computer readable medium may store computer readable instructions, i.e., program code, that can be executed by a processor or DSP to carry out one of more of the methods described methods. For example, the computer readable medium may comprise random access memory (RAM), read-only memory (ROM), non-volatile random access memory (NVRAM), electrically erasable programmable read-only memory (EEPROM), flash memory, or the like. The computer readable medium may comprise computer-readable instructions that when executed in an OLT or ONT on a PON, cause the device to carry out one or more of the techniques described herein.

The invention may offer one or more advantages. First, the traffic management techniques, as described herein, can eliminate the need for a metering function that is located upstream of the OLT, or outside the access network. This feature may be of particular value because the access network is typically the limiting factor that requires attention to bandwidth management. Moreover, the techniques described herein may not require a Broadband Remote Access Server (BRAS). A BRAS monitors the traffic to an ONT, but does not allow the advantage of multicasting on the PON. In addition, the techniques described herein may require less configuration by the operator, may provide efficient use of bandwidth while preventing an ONT from being overrun, and may eliminate scalability issues associated with a BRAS.

Furthermore, the traffic management techniques can meter the flow of traffic to an individual ONT on a per stream basis, rather than provision the bandwidth per channel. Specifically, the bandwidth of any common packet stream can be determined and the ONT can then selectively permit or deny access to the common packet stream. For example, the ONT may be provisioned with a bandwidth map for each common packet stream the ONT can receive. Thus, when the ONT selects a common packet stream, the ONT can determine if each stream can be admitted by referring to the associated bandwidth map. When a common packet stream does not have an associated bandwidth map, a flow meter can be associated with the stream at the OLT to determine the bandwidth and populate the bandwidth map. In any case, the ONT can refer to the bandwidth map and determine if the common packet stream would cause the ONT to overflow. The ONT can then selectively permit or deny access to the common packet stream based on the bandwidth capacity of the ONT. For example, the ONT may deny access to the common packet stream, admit access to the common packet stream, or admit access to the common packet stream in conjunction with a reduction in the transmission rate of unique packet stream.

Alternatively, an OLT may interrogate a request for a common packet stream from an ONT and reference a bandwidth table that stores the bandwidths of the common packet streams that can be requested by the ONT. Consequently, the OLT can determine the available bandwidth capacity of the ONT and the bandwidth required for the requested common packet stream and can selectively permit or deny access to the requested packet stream in accordance with a predetermined admission policy. In this manner, the invention may enable an individual ONT or, alternatively, an OLT to selectively permit and deny access to a unique packet stream and a selected packet stream without overrunning the ONT.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
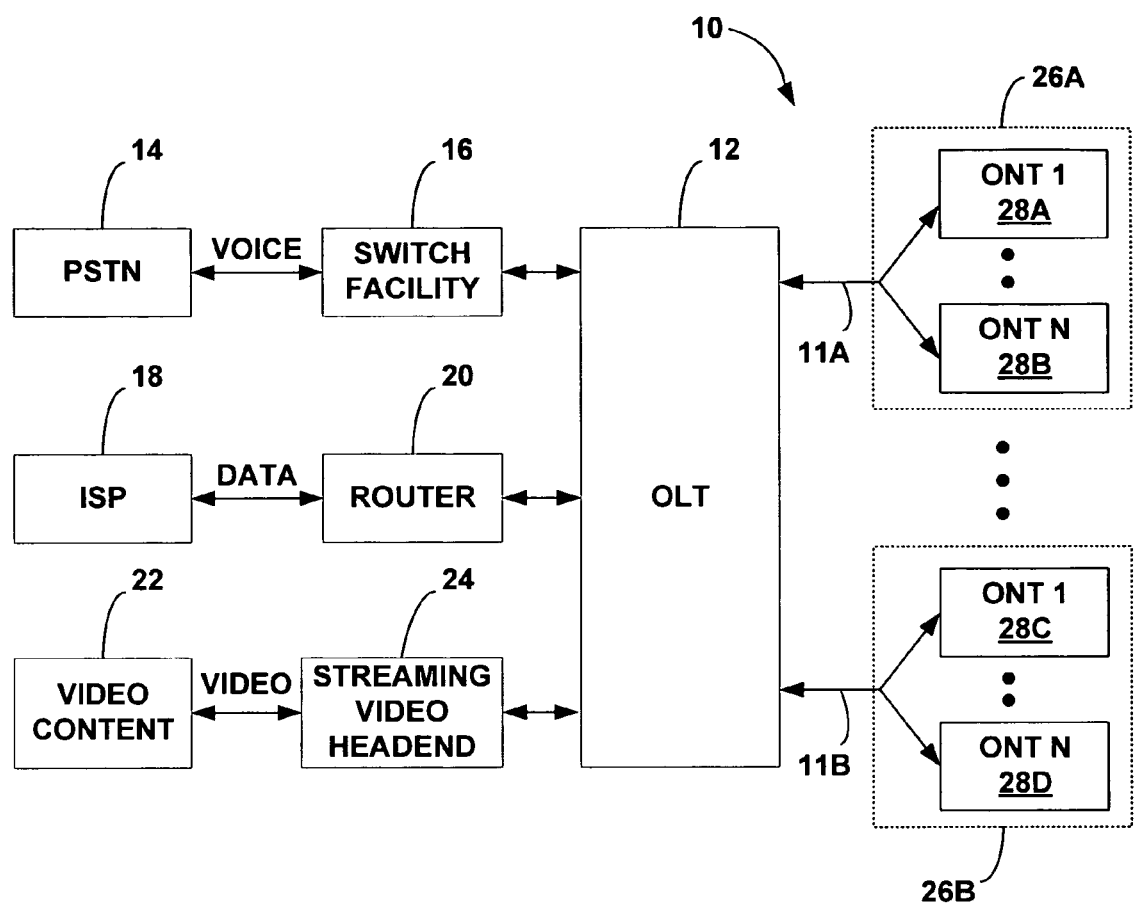
FIG. 1 is a block diagram illustrating an exemplary passive optical network (PON) that employs traffic management techniques in accordance with an embodiment of the invention.

FIG. 1 is a block diagram illustrating a passive optical network (PON) 10. As shown in FIG. 1, PON 10 can be arranged to deliver voice, data and video content (generally "information") to a number of ONTs via optical fiber links. Exemplary components for implementing a PON are commercially available from Optical Solutions, Inc., of Minneapolis, Minn., and designated by the tradename Fiberpath 400™, including the Fiberdrive™ headend bay interface and the Fiberpoint™ subscriber premise nodes.

An optical line terminator (OLT) 12 may receive voice information, for example, from a public switched telephone network (PSTN) 14 via a switch facility 16. In addition, OLT 12 may be coupled to one or more Internet service providers (ISP's) 18 via the Internet and a router 20. As further shown in FIG. 1, OLT 12 may receive video content 22 from video content suppliers via a streaming video headend 24. In each case, OLT 12 receives the information, and distributes the information along optical fiber links 11A and 11B (collectively "fiber links 11") to groups 26A and 26B (collectively "groups 26") of optical network terminals (ONTs) 28A, 28B, 28C and 28D (collectively "ONTs 28"). In the following description, an individual ONT may be referred to as ONT 28, and in such cases, "ONT 28" refers to any one of ONTs 28A-28D. Each of groups 26 is coupled to a respective one of optical fiber links 11. OLT 12 may be coupled to any number of fiber links 11. FIG. 1 shows only two fiber links 11A, 11B for purposes of illustration, although many more fiber links may also be used.

ONTs 28 include hardware for receiving information from PON 10 via optical fiber links 11, and delivering the information to a connected subscriber device (not shown), or one or more connected devices (not shown) within a local area network (LAN) associated with the ONT. For example, each of ONTs 28 may serve as a PON access point for one or more computers, network appliances, televisions, set-top boxes, wireless devices, or the like. OLT 12 may be located near or far from a group 26 of ONTs 28. In some existing networks, however, OLT 12 may reside in a central office situated within approximately ten miles from each of the ONTs 28.

An individual ONT 28 may be located at any of a variety of locations, including residential or business sites. In addition, an individual ONT 28 may operate on a shared basis to deliver information to two or more closely located residences or businesses via copper or additional optical fiber connections, either directly or via a network hub, router or switch. A group 26 of ONTs 28 may refer to nodes served by OLT 12 via a common optical fiber link 11. Each group 26 in FIG. 1 contains two ONTs 28 for purposes of illustration. However, a group 26 may include an individual ONT, or numerous ONTs.

Each ONT 28 may also include hardware for transmitting information over PON 10. For example, an ONT 28 may transmit voice information over PSTN 14 via OLT 12 and switch facility 16 in the course of a telephone conversation. In addition, an ONT 28 may transmit data to a variety of ONTs 28 on the Internet via ISP 18, router 20 and OLT 12. Multiple ONTs 28 typically transmit upstream over a common optical fiber link 11 using time division multiplexing techniques.

Generally, an individual ONT 28 may receive traffic from several sources. Some sources may be commonly used among several of ONTs 28. For example, a common traffic flow associated with switched digital video (SDV) or other multicast streams, such as video content 22 received from streaming video headend 24, may be accessed by a plurality of ONTs 28. As used herein, a common packet stream, such as multicast switched digital video (SDV), refers to a packet stream that is addressed to a plurality of ONTs 28. Other sources, such as ISP 18 or PSTN 18, may produce unicast traffic flows that are unique to an individual ONT 28. A unique packet stream refers to a packet stream that is addressed to an individual ONT 28. A unique packet stream is inherently multicast, but is addressed to only the particular ONT that requested the packet stream. The transmission rate of a unique packet stream can be metered or reduced while a common packet stream is generally received at a common, fixed transmission rate. However, the bandwidth capacity of an individual ONT 28 may be limited, such as limited to 100 Mbps. Consequently, access to one or more common traffic flows may exceed the bandwidth capacity of the individual ONT 28 and cause the individual ONT 28 to be overrun, thereby rendering the individual ONT 28 unable to forward packets to connected subscriber devices (not shown).

As will be described in detail, PON 10 provides traffic management techniques designed to meter the flow of traffic to an individual ONT 28 to prevent overflow. The ability of an individual ONT 28 to access one or more common packet streams can be limited by the available bandwidth capacity of the individual ONT 28. Since the bandwidth capacity of an individual ONT 28 is limited, the traffic management techniques can be applied to selectively permit or deny access to a packet to prevent an individual ONT 28 from being overrun.

In one example, the techniques involve reducing a transmission rate of a unique packet stream received by an individual ONT 28. In particular, the individual ONT 28 sends a request to OLT 12 to reduce the transmission rate of the unique packet stream in order to receive a second packet stream without being overrun, i.e., without exceeding the bandwidth capacity of the individual ONT 28. By reducing the transmission rate, additional bandwidth may be released, thereby allowing the individual ONT 28 to access one or more other unique packet streams or one or more common packet streams without being overrun. Specifically, the individual ONT 28 may transmit a request to OLT 12 to reduce the transmission rate associated with the unique packet stream when receiving the unique packet stream at a reduced transmission rate and a second packet stream would not exceed the bandwidth capacity of the individual ONT 28. OLT 12 may then send the unique packet stream at a reduced transmission rate in response to receiving the request from the individual ONT 28. Thus, the individual ONT 28 can admit the second packet stream while concurrently receiving the unique packet stream at a reduced transmission rate without being overrun.

In another example, the traffic management techniques may involve receiving a unique packet stream and denying access to a selected packet stream. In this case, denying access to the selected packet stream is based on determining whether receiving the unique packet stream and the selected packet stream would collectively exceed the bandwidth capacity of an individual ONT 28. The selected packet stream may be a common or a unique packet stream. In any case, when receiving the unique packet stream and the selected packet stream would collectively exceed the bandwidth capacity, the individual ONT 28 may send a request to OLT 12 to reduce a transmission rate associated with the unique packet stream, as previously described, when receiving the unique packet stream at a reduced transmission rate and the selected packet stream would not collectively exceed the bandwidth capacity of the individual ONT 28. However, the individual ONT 28 may deny access to the selected packet stream when receiving the unique packet stream at the reduced transmission rate and the selected packet stream would collectively exceed the bandwidth capacity of the individual ONT 28. When the selected packet stream is not accessed, the transmission rate of the unique packet stream is not reduced. Thus, the individual ONT 28 does not send a request to OLT 12.

Moreover, the unique packet stream may also have a minimum transmission rate. Accordingly, the transmission rate of the unique packet stream cannot be reduced below the corresponding minimum transmission rate. Thus, the individual ONT 28 may deny access to the selected packet stream when the transmission rate of the unique packet stream must be reduced below the minimum rate to accommodate both packet streams. Again, when the selected packet stream is not admitted, the transmission rate of the unique packet stream is not reduced and, thus, a request does not need to be sent to OLT 12.

In an alternative example, the techniques involve OLT 12 determining a policy for admission of a common packet stream requested by an individual ONT 28, as opposed to the individual ONT 28 determining the policy for admission of the requested packet stream. In this example, an individual ONT 28 may simply send a request, such as an internet group management protocol (IGMPv2) join request, to OLT 12 for a common packet stream while already receiving a unique packet stream. OLT 12 may interrogate the request and reference a bandwidth table to determine the collective bandwidth requirement of the combined bandwidth of the unique packet stream and the requested packet stream. OLT 12 may then permit or deny access to the requested packet stream in accordance with a predetermined admission policy, i.e., send the requested common packet stream without reducing the transmission rate of the unique packet stream when the combined bandwidth requirement of the packet streams would not exceed the bandwidth capacity of the individual ONT 28, send the requested common packet stream and reduce the transmission rate of the unique packet stream when receiving the requested common packet stream and the unique packet stream at the reduced transmission rate would not collectively exceed the bandwidth capacity of the individual ONT 28, and deny the individual ONT 28 access to the requested common packet stream when receiving the requested common packet stream and the unique packet stream at the reduced transmission rate would collectively exceed the bandwidth requirement of the individual ONT 28, as previously described. OLT 12 may also deny the individual ONT 28 access to the requested common packet stream when the transmission rate of the unique packet stream must be reduced below a minimum transmission rate in order to prevent the individual ONT 28 from being overrun. Thus, the traffic management techniques are implemented in OLT 12 rather than an individual ONT 28. In any case, the traffic management techniques described herein can prevent an individual ONT 28 from being overrun by permitting or denying access to a selected packet stream while receiving a unique packet stream at a variable transmission rate.

Additionally, the traffic management techniques, as described herein, can eliminate the need for a metering function that is located upstream of OLT 12, or outside the access network. This feature may be of particular value because the access network is typically the limiting factor that requires attention to bandwidth management. Moreover, the techniques described herein may not require a Broadband Remote Access Server (BRAS) to monitor the traffic to ONTs 28. While a BRAS may monitor all traffic to an individual ONT 28, it does not allow the advantage of multicasting on PON 10. In addition, the techniques described herein may require less configuration by the operator, may provide efficient use of bandwidth while preventing an ONT 28 from being overrun, and may eliminate scalability issues associated with a BRAS.

Furthermore, unlike traffic management techniques that provision bandwidth per channel, the traffic management techniques described herein meter the flow of traffic to an individual ONT 28 on a per stream basis. Specifically, the bandwidth of a common packet stream can be determined and an individual ONT 28 or, alternatively, OLT 12 can selectively permit or deny access to the common packet stream in accordance with a predetermined admission policy. For example, an individual ONT 28 may be provisioned with a bandwidth map for each common packet stream the individual ONT 28 can receive. Thus, when the individual ONT 28 selects a common packet stream, the individual ONT 28 can determine if each stream can be admitted by referring to the associated bandwidth map. When a common packet stream does not have an associated bandwidth map, a flow meter can be associated with the stream at OLT 12 to determine the bandwidth. In any case, the individual ONT 28 can refer to the bandwidth map and determine if accessing the common packet stream would cause the individual ONT 28 to overflow. The individual ONT 28 can then selectively permit or deny access to the common packet stream based on the bandwidth capacity of the individual ONT 28. For example, the individual ONT 28 may deny access to the common packet stream, establish the stream, or establish the stream but reduce the transmission rate of the unique packet stream by an appropriate amount.

In an alternative example, OLT 12 may store a bandwidth table that includes the bandwidths of the common packet streams that can be requested by ONTs 28. Consequently, OLT 12 can determine the bandwidth requirement of the requested packet stream and, therefore, also permit or deny access to the common packet stream in accordance with a predetermined admission policy. Thus, the traffic management techniques described herein may enable an individual ONT 28 or, alternatively, OLT 12 to selectively permit and deny access to a unique packet stream and a selected packet stream without overrunning the individual ONT 28.

Figure 2:
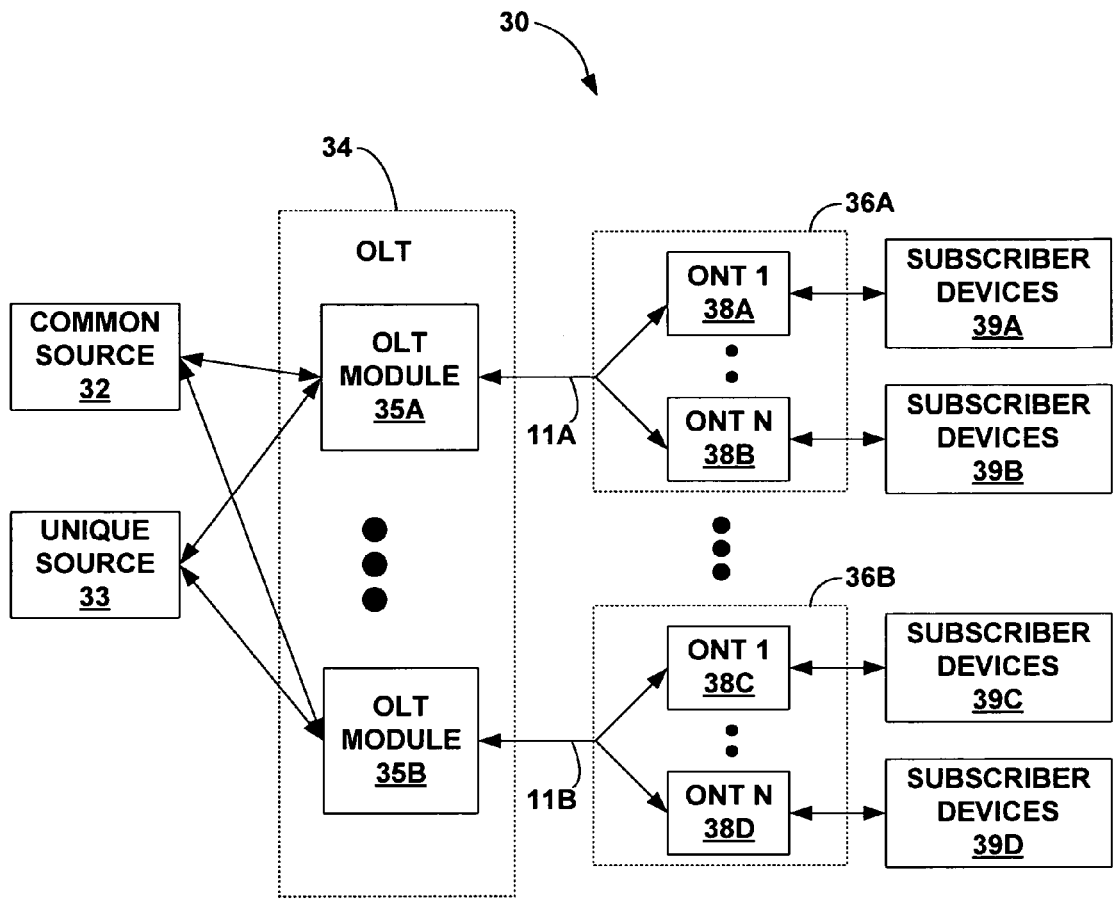
FIG. 2 is a block diagram illustrating an exemplary PON that employs traffic management techniques to manage traffic received from a common source and a unique source in accordance with an embodiment of the invention.

FIG. 2 is a block diagram illustrating a PON 30 that manages traffic received from common source 32 and unique source 33 in accordance with described traffic management techniques. Generally, an OLT 34 may receive common and unique packet streams from common source 32 and unique source 33, respectively, and distributes the streams along fiber links 31A and 31B (collectively "fiber links 31") to groups 36A and 36B (collectively "groups 36") of ONTs 38A, 38B, 38C, and 38D (collectively "ONTs 38"). PON 30 may include any number of ONTs 38 arranged in groups 36. In the illustrated example, only two groups 36A, 36B with any number of ONTs 38 in each group are shown for purposes of illustration, although PON 30 many include many more groups coupled to OLT 34 by a corresponding number of optical fiber links. In addition, each of ONTs 38 is coupled to subscriber devices 39A-39D (collectively "subscriber devices 39"), respectively. Each of subscriber devices 39 may comprise one or more computers, network appliances, televisions, set-top boxes, wireless devices, or the like. Furthermore, each of ONTs 38 may include hardware for transmitting and receiving information over PON 30 as described with respect to ONTs 28 of FIG. 1. In the following description, an individual ONT may be referred to as ONT 38, and in such cases, "ONT 38" refers to any one of ONTs 38A-38D.

As shown in FIG. 2, OLT 34 may include multiple OLT modules 35A and 35B (collectively "OLT modules 35"), which may be arranged in a common chassis. Each OLT module 35 may form an independent Ethernet interface that serves a group 36 of ONTs 38 coupled to a respective one of optical fiber links 31. Hence, each one of OLT modules 35 and the associated ONTs 38 terminate opposite ends of an optical fiber link 31. In some embodiments, an optical fiber link may include a pair of optical fibers forming an outgoing link and an incoming link.

OLT modules 35 may receive a common packet stream, i.e., a multicast or SDV packet stream, from common source 32. Common source 32 may, for example, be a remote server connected to OLT modules 35 via routers within a network such as the Internet. In some embodiments, common source 32 may be a streaming video headend 24 connected to OLT modules 35 via a digital television network. A common packet stream may include real-time video, audio, voice and/or other types of data. For example, a common packet stream may be a pay-per-view television event, a real-time audio broadcast, or real-time information provided via the Internet such as stock prices or weather conditions.

In general, common source 32 sends a common packet stream to OLT modules 35 as multiple Internet Protocol (IP) multicast packets identified by a Class-D internet protocol (IP) address within a destination address portion of the packet header. In some embodiments, OLT modules 35 may assemble the IP multicast packets into Asynchronous transfer mode (ATM) cells for multicast transmission on a virtual channel circuit (VCC) over links 31. Since PON 30 may be described as an inherently downstream-multicast medium, OLT modules 35 send the common packet stream to each of ONTs 38 via optical fiber links 31. In particular, each of OLT modules 35 sends the common packet stream to a corresponding group 36 of ONTs 38 via an optical fiber link 31. This property of PON 30 allows an OLT module 35 to deliver a common packet stream to each of ONTs 38 within a corresponding group 36 by a common fiber optical link 31 without replicating the packets of the multicast medium. However, only ONTs 38 to which the common packet stream is addressed may access the stream. ONTs 38 to which the common packet stream is addressed are identified by a single multicast group destination address which is included in the common packet stream. Each ONT 38 is then responsible for selecting packets, or cells, associated with a desired common packet stream.

An individual ONT 38 may select a particular common packet stream by examining the multicast group destination address. As an example, an individual ONT 38 may receive membership requests from corresponding subscriber devices 39 to join a multicast group. By joining a multicast group, subscriber devices 39 are requesting to receive all multicast packet streams transmitted to the individual ONT 38 corresponding to the multicast group. Subscriber devices 39 may request membership in one or more multicast groups or no multicast groups. In some embodiments, subscriber devices 39 may use an IGMPv2 to request multicast group membership. In this case, the individual ONT 38 listens for membership requests from corresponding subscriber devices 39. The individual ONT 38 then processes the membership requests and selects the multicast packet stream corresponding to the pertinent multicast group. When no subscriber devices 39 are part of the multicast group associated with selected packet stream, the individual ONT 38 does not select the common packet stream.

In the case of common, multicast traffic, ONTs 38 can be provisioned with a bandwidth description table or bandwidth map that stores the bandwidth associated with each common packet stream the ONTs 38 can receive. Typically, the bandwidth map is not static and is stored by OLT 34. Thus, OLT modules 35 may periodically transmit the bandwidth map to ONTs 38 and an individual ONT 38 may refer to the bandwidth map to determine the bandwidth requirement of a selected common packet stream. Consequently, the individual ONT 38 can refer to the bandwidth map for a selected common packet stream and determine if accessing the stream would exceed bandwidth capacity of the individual ONT 38.

Alternatively, ONTs 38 may simply send a request to OLT 34 or the corresponding one of OLT modules 35 to receive a common packet stream. More specifically, ONTs 38 may select the common packet stream in a similar manner as previously described and then send a request to OLT 34 to receiving the selected common packet stream. Upon receiving the request, OLT modules 35 may refer to the bandwidth map to determine the bandwidth of the requested common packet stream. As a result, OLT modules 35 may determine if a requested common packet stream would exceed the bandwidth capacity of the individual ONT 38 that requested the common packet stream. In this case, OLT modules 35 may not be required to periodically transmit the bandwidth map to ONTs 38.

When a common packet stream does not have an established bandwidth profile, a flow meter can be associated with the common packet stream. The flow meter may be a software function of OLT 34, or OLT modules 35, that determines the flow rate or bandwidth requirement of a common packet stream. The flow meter may provide the bandwidth requirement to a multicast manager or queue, also located at OLT 34 or OLT modules 35, that assembles the multicast packets into ATM cells to form the common packet stream. Thus, an individual ONT 38 or, alternatively, OLT 34 or an individual OLT module 35 can determine the bandwidth requirement of a selected common packet stream and selectively permit or deny access to the common packet stream in accordance with the traffic management techniques, as will be described in detail.

OLT module 34 may also receive a unique packet stream from unique source 33. Unique source 33 may be a remote server connected to OLT module 34 via routers within a network such as the Internet or may be a switch facility within a PSTN network. A unique packet stream may carry voice and data information addressed to an individual ONT 38, rather than multiple ONTs 38 in common. For example, a unique packet stream may carry voice information associated with a telephone call placed over PSTN 14 or data provided by ISP 18.

In particular, unique source 33 sends a unique packet stream to one of OLT modules 35 as multiple IP unicast packets identified by a standard IP address within a destination address portion of the packet header. An OLT module 35 may assemble the IP unicast packets into ATM cells for unicast transmission on a VCC over optical fiber links 31. The OLT module 35 sends the unique packet stream to an individual ONT 38 in response to receiving a request from the individual ONT 38. The individual ONT 38 may establish upstream communication with the OLT module 35 using time division-multiplexing techniques described in the IEEE 802.3 standard. The individual ONT 38 may listen for requests from subscriber devices 39 and buffer the requests from subscriber devices 39 until the appropriate timeslot arrives. When the appropriate timeslot arrives, the individual ONT 38 sends the buffered requests upstream to the OLT module 35. In this manner, the individual ONT 38 can request a unique packet stream from the corresponding OLT module 35.

The corresponding OLT module 35 sends a unique packet stream to the individual ONT 38 in response to the request. Each packet of the unique packet stream includes a unique medium access control (MAC) destination address that identifies a unique station of subscriber devices 39 connected to an individual ONT 38. For example, the MAC address may identify a particular station of subscriber devices 39 such as a computer, a network appliance, a television, a set-top box, or a wireless device connected to the individual ONT 38. The unique MAC address is assigned at the factory or during station configuration. The OLT module 35 sends the unique packet stream only to the individual ONT 38. The individual ONT 38 may then send the unique packet stream to the connected subscriber devices 39. In one example, each station of subscriber devices 39 receives the unique packet stream. In this case, each of the corresponding subscriber devices 39 process the packets based on the MAC destination address. Subscriber stations 39 discard or ignore the unique packets when the MAC destination address included in the packet does not match the particular station's MAC address. In another example, the individual ONT 38 may process the received packets and only send the unique packet stream to the station with a matching MAC address.

Each of ONTs 38 typically has a port to receive traffic from common source 32 and unique source 33. OLT 34 sends multicast traffic from common source 32 to ONTs 38 using one pathway that may be common and shared with other ONTs 38 and sends unicast traffic from unique source 33 on a separate pathway(s) that is unique to an individual ONT 38. An OLT module 35 within OLT 34 generally delivers a common packet stream to multiple ONTs 38 at a fixed transmission rate and cannot meter, or throttle down, the common packet stream to accommodate the ONT with the lowest available bandwidth capacity. However, the transmission rate of a unique packet stream to a given one of ONTs 38 may be metered or reduced by the appropriate OLT module 35. Moreover, the bandwidth capacity of an individual ONT 38 may be such that the throughput is limited, such as a 100 Mbps interface. In addition, the transmit bandwidth of common source 32 and unique source 33 may or may not be coordinated. Consequently, access to two or more packet streams may exceed the bandwidth capacity of the ONT 38 and cause the ONT 38 to be overrun, thereby rendering ONT 38 unable to forward packets to subscriber devices 39. More specifically, accessing one or more common or unique packet streams while concurrently receiving a unique packet stream may cause an individual ONT 38 to overflow.

OLT 34 and ONTs 38 on PON 30 implement traffic management techniques in accordance with the invention to prevent ONTs 38 from overflowing. Generally, the traffic management techniques prevent an individual ONT 38 from overflowing by metering the flow of a unique packet stream and selectively denying or permitting access to additional traffic based on the bandwidth capacity of the individual ONT 38. In particular, one embodiment of the invention implements the traffic management techniques in ONTs 38 and an alternative embodiment of the invention implements the traffic management techniques in OLT 34 or OLT modules 35. In other words, the functionality to selectively permit and deny access to a selected packet stream is implemented in each of ONTs 38 in one embodiment of the invention and the functionality is implemented in OLT 34 or OLT modules 35 in an alternative embodiment. Each different case may have distinct advantages for different applications. In any case, the traffic management techniques ensure that the individual ONT 38 does not exceed its bandwidth capacity, thereby maintaining the ONT's ability to forward received packets to subscriber devices 39.

In particular, the traffic management techniques take advantage of the ability of a single OLT module 35 to reduce the transmission rate of a unique packet stream, while accommodating the general inability of the OLT module 35 to meter the transmission rate of a common packet stream. In other words, by reducing the transmission rate of a unique packet stream, bandwidth previously dedicated for the unique packet stream may be released to provide added capacity for an individual ONT 38 to receive a fixed-rate common packet stream. Hence, the traffic management techniques in accordance with the invention involve reducing the transmission rate of a unique packet stream to release sufficient bandwidth to accommodate a common packet stream. The traffic management techniques also involve receiving a unique packet stream and selectively permitting or denying access to a selected packet stream based on the bandwidth capacity of an individual ONT 38. For example, the individual ONT 38 may access the selected stream when sufficient bandwidth is available, access the selected stream but reduce the transmission rate of a unique packet stream by an appropriate amount, or deny access to the selected stream altogether. In this manner, the traffic management techniques provide efficient use of bandwidth while preventing ONTs 38 from being overrun.

In operation, an individual ONT 38 may initially receive a unique packet stream from a corresponding OLT module 35 via unique source 33. The unique packet stream may be received at a constant rate by the individual ONT 38. The transmission rate may be a default rate set by the individual ONT 38 or the OLT module 35 or may be determined based on the available bandwidth capacity of the ONT 38 at the time the individual ONT 38 requested the stream. The individual ONT 38 may then select a second packet stream to receive. The second packet stream may be a common packet stream or a different unique packet stream. As an example, subscriber devices 39 connected to the individual ONT 38 may send an IGMPv2 join request to join a multicast group. The individual ONT 38 listens for the IGMPv2 join request and selects the common packet stream associated with the multicast group as previously described. In another example, subscriber devices 39 may communicate with the individual ONT 38 to send an upstream request to the appropriate OLT module 35 to receive another unique packet stream as previously described. Herein, the individual ONT 38 is described as selecting a common packet stream for purposes of brevity, although the invention should not be limited as such. Those skilled in the art will appreciate that the individual ONT 38 may select a common packet stream or another unique packet stream while concurrently receiving the first unique packet stream at a constant transmission rate.

Upon selecting the common packet stream, the individual ONT 38 processes the multicast packets to determine the bandwidth requirement of the stream. In particular, the individual ONT 38 refers to the bandwidth map associated with the stream. When a bandwidth map is not associated with the selected common packet stream, a flow meter may be associated with the stream to determine the bandwidth requirement. For example, the corresponding OLT module 35 may associate a flow meter with the selected common packet stream in response to a request received from the individual ONT 38. In any case, after determining the bandwidth requirement of the selected common packet stream, the individual ONT 38 may determine if the bandwidth requirement of the selected stream exceeds the available bandwidth capacity of the individual ONT 38. In other words, the individual ONT 38 may sum the bandwidth requirement of the unique packet stream and the selected common packet stream and compare the result to its bandwidth capacity to determine if accessing the common packet stream would exceed its bandwidth capacity.

When accessing the selected common packet stream would not exceed the bandwidth capacity of the individual ONT 38, the individual ONT 38 may simply access the selected stream and receive the unique and common packet stream without being overrun. However, when accessing the selected common packet stream would exceed the bandwidth capacity of the individual ONT 38, the individual ONT 38 may further determine if receiving the unique packet stream at a reduced transmission and accessing the selected packet stream would still exceed its bandwidth capacity.

In one example, the individual ONT 38 may reduce the transmission rate of the unique packet stream when receiving the unique packet stream at a reduced transmission rate and the selected common packet stream would not exceed its bandwidth capacity. By reducing the transmission rate of the unique packet stream, additional bandwidth may be released in order to accommodate the selected common packet stream. In other words, the individual ONT 38 may reduce the transmission rate of the unique packet stream to release bandwidth previously dedicated for the unique packet stream in order to accommodate the selected fixed rate common packet stream. In particular, the individual ONT 38 may send a request upstream to a multicast manager or queue within OLT 34 using standard time division-multiplexing techniques. The request may specify the rate at which to send the selected packet stream. OLT 34 may then send the unique packet stream at the reduced rate in response to receiving the request from ONT 38. However, the unique packet stream may have a minimum transmission rate.

When the transmission rate of the unique packet stream is allowed to be reduced, a minimum provisioning bandwidth profile may be established. The provisioning bandwidth profile may specify that the transmission rate of the unique stream should not fall below a given minimum transmission rate or threshold. The minimum transmission rate may be determined based on the rate necessary to avoid undesirable latency, e.g., for voice communication. If accessing the selected common packet stream would require reducing the unique packet stream below the minimum transmission rate, then the individual ONT 38 may deny access to the selected common packet stream. In this case, the transmission rate of the unique packet stream is not reduced and the individual ONT 38 may not send a request to the corresponding OLT module 35. Thus, transmission of the unique packet stream at or above the minimum transmission rate may be given the highest priority in transmissions to the ONT 38.

If receiving the unique packet stream at the reduced transmission rate and the selected packet stream would still exceed the bandwidth capacity of the individual ONT 38, the individual ONT 38 continues to receive the unique packet stream and denies access to the selected common packet stream. Again, in this case, since the selected packet stream is not received, the transmission rate of the unique packet stream is not reduced.

In an alternative embodiment, an individual ONT 38 may initially receive a unique packet stream and subsequently send a request to OLT 34 or the corresponding OLT module 35 to receive a common packet stream. In this case, rather than the individual ONT 38 processing the multicast packets to determine the bandwidth requirement of the common packet stream, OLT 34 receives the request and refers to the bandwidth map to determine the bandwidth requirement of the requested common packet stream. In particular, OLT 34 may interrogate the request, such as an IGMPv2 join request, and reference the bandwidth map to determine the admission policy, i.e., send the requested stream when sufficient bandwidth is available, send the selected stream but reduce the transmission rate of the unique packet stream by an appropriate amount, or deny access to the selected stream altogether, as previously described with respect to an individual ONT 38.

For example, OLT 34 may interrogate an IGMPv2 join request received from an individual ONT 38 to identify which common packet stream is being requested and the available bandwidth capacity of the individual ONT 38. Upon identifying the requested common packet stream, OLT 34 can refer to the bandwidth map to determine the bandwidth requirement for the requested common packet stream and, thus, admit or deny access to the requested common packet stream in accordance with the predetermined admission policy, as previously described. Accordingly, OLT 34 may not periodically send the bandwidth map to ONTs 38 since OLT 34 implements the traffic management techniques, i.e., selectively permits and denies access to selected packet stream.

Thus, the traffic management techniques described herein may be implemented in either ONTs 38 or OLT 34. In this manner, the traffic management techniques prevent ONTs 38 from being overrun by selectively permitting or denying access to a selected packet stream while receiving a unique packet stream at a variable transmission rate.

The benefit of the traffic management techniques described herein is that an individual ONT 38 can gracefully handle the convergence of a unique packet stream and one or more traffic streams independently of other ONTs 38 that may also be receiving one of the streams. In particular, the techniques meter the flow of traffic to ONTs 38 on a per stream basis rather than provision the bandwidth per channel. Moreover, the techniques provide ONTs 38 and OLT 34 on PON 30 with a method for efficient use of its bandwidth capacity.

Figure 3:
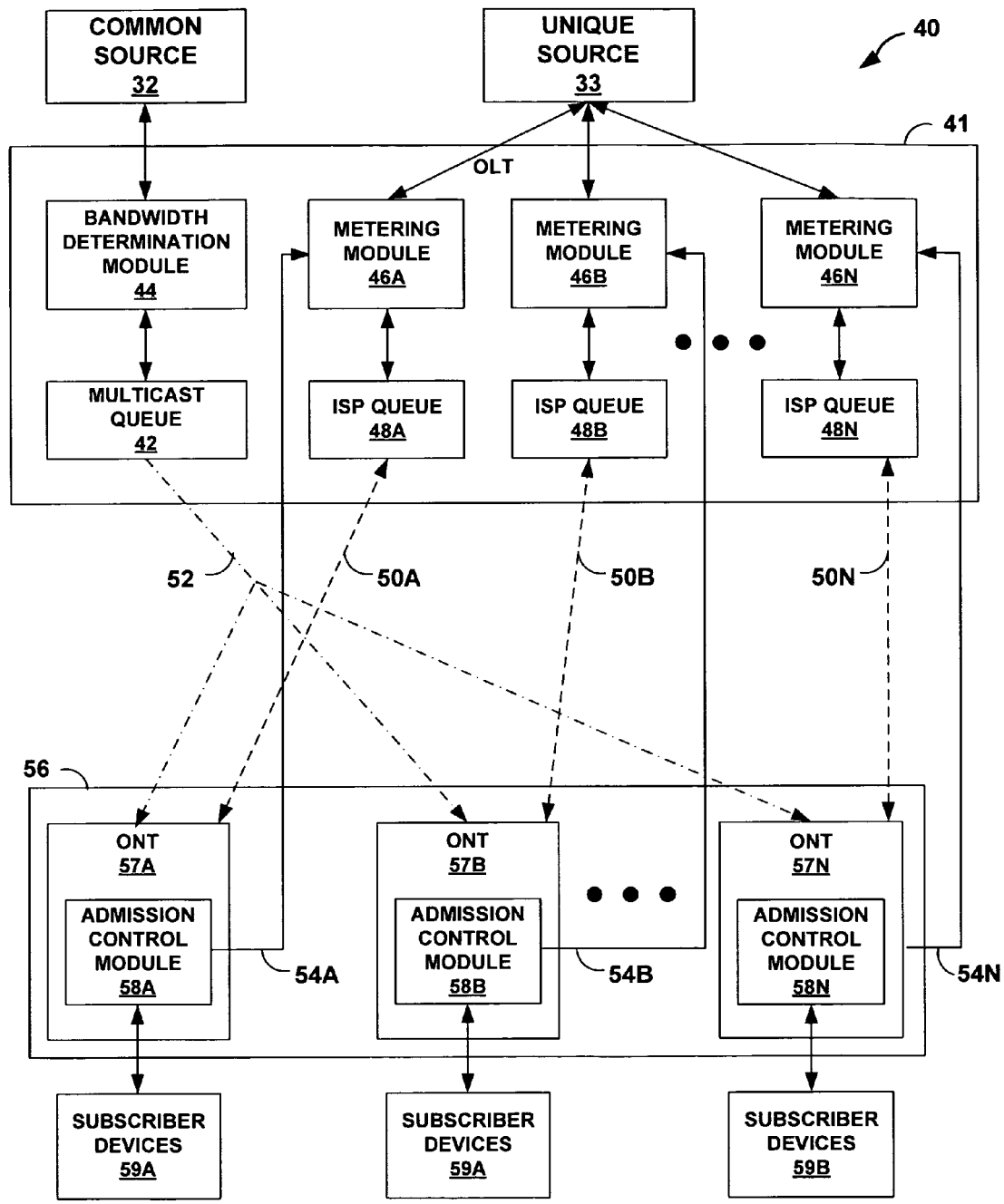
FIG. 3 is a block diagram illustrating an exemplary PON for implementing the traffic management techniques in accordance with an embodiment of the invention.

FIG. 3 is a block diagram illustrating a single OLT module 41 on a PON 40 that delivers unicast and multicast traffic to a group 56 of ONTs 57A-57N (collectively "ONTs 57") in accordance with the described traffic management techniques. In contrast to PON 30 of FIG. 2, PON 40 only includes OLT module 41 for purposes of illustration, although PON 40 may also include additional OLT modules arranged in a common chassis.

OLT module 41 may receive multicast and unicast traffic from common source 32 and unique source 33, respectively, and deliver the multicast and unicast traffic to group 56 of ONTs 57 as common packet stream 52 and unique packet streams 50A-50N (collectively "unique packet streams 50"). Common packet stream 52 is shown as a dashed-and-dotted line while unique packet streams 50 are shown as dashed lines. In addition, each of ONTs 57 is coupled to subscriber devices 59A-59N (collectively "subscriber devices 59"), respectively. In the following description, an individual ONT may be referred to as ONT 57, and in such cases, "ONT 57" refers to any one of ONTs 57A-57N.

As shown in FIG. 3, each of ONTs 57 includes an admission control module 58A-58N (collectively "admission control modules 58"), respectively. In general, admission control modules 58 implement the described traffic management techniques to prevent ONTs 57 from being overrun. In this example, OLT module 41 includes a multicast queue 42 and a bandwidth determination module 44 as well as ISP queues 48A-48N (collectively "ISP queues 48") for each of ONTs 57, respectively.

Common source 32 sends a stream of multicast packets to multicast queue 42 as multiple IP multicast packet identified by a class-D IP address. Multicast queue 42 assembles the multicast packets into ATM cells to form common packet stream 52 and delivers common packet stream 52 to each of ONTs 57 even though only one of ONTs 57 may belong to the multicast group associated with common packet stream 52. Again, the ONTs 57 to which common packet stream 52 is addressed are identified by a single multicast group destination address included in the header of each packet. Each ONT 57 examines the multicast group destination address to select the packets associated with the multicast group to which it belongs. As previously described, ONTs 57 may use an IGMPv2 join request to request membership to a particular multicast group.

Bandwidth determination module 44 communicates with multicast queue 42 to provision common packet stream 52 with a bandwidth map. Since the bandwidth map is typically not static, bandwidth determination module 44 may periodically communicate with multicast queue 42 to ensure the bandwidth map accurately reflects the bandwidth requirement of common packet stream 52. When a bandwidth map is not established for common packet stream 52, the flow rate or bandwidth requirement of common packet stream 52 may be determined by a flow meter. The flow meter may be implemented as a software function in bandwidth determination module 44. In this case, bandwidth determination module 44 determines the bandwidth requirement of common packet stream 52 and communicates the bandwidth requirement to multicast queue 42 in order to provision common packet stream with a bandwidth map. Thus, upon selecting common packet stream 52 by processing IGMPv2 join requests received from a connected subscriber devices 59, an individual ONT 57 may refer to the bandwidth map associated with common packet stream 52.

OLT module 41 may also transmit unique packet streams 50 to ONTs 57, respectively. In general, each of ISP queues 48 handles packets that form corresponding unique packet streams 50. Unique source 33 sends streams of unicast packets to ISP queues 48 as multiple EP unicast packets identified by a standard IP address. ISP queues 48 then assemble the IP unicast packets into ATM cells to form unique packet streams 50. Each of unique packet streams 50 includes a unique MAC address that identifies a particular station of subscriber devices 59 connected to an individual ONT 57. In particular, ISP queues 48 send unique packet streams 50 to only the individual ONT 57 associated with the MAC address in the packet header. In this example, ISP queues 48 transmit web content to ONTs 57, however, OLT module 41 may also include one or more service queues to transmit unique packet streams carrying other unicast data, such as voice data from a PSTN, to ONTs 57.

Metering modules 46 communicate with respective ISP queues 48 to meter the rate at which ISP queues 48 transmit unique packet streams 50. In particular, a metering module 46 may receive a request from an individual ONT 57 to reduce the transmission rate of unique packet streams 50. In some embodiments, ONTs 57 may send a request to reduce the transmission rate of a unique packet stream 50 to metering modules 46 via out of band control channels 54A-54N (collectively "out of band control channels 54"). Out of band control channels 54 are shown in solid lines.

Generally, multicast queue 42 and ISP queues 48 send common packet stream 52 and unique packet streams 52, respectively, to ONTs 57. An individual ONT 57 may receive a unique packet stream and one or more common or unique packet streams. In this example, each of ONTs 57 receives a unique packet stream 50 from a corresponding ISP queue 48 and may also receive common packet stream 52 from multicast queue 42. An individual ONT 57 may send a request to the corresponding metering module 46 to reduce the transmission rate of a unique packet stream 50. However, multicast queue 42 generally sends common packet stream 52 to each of ONTs 57 at a fixed rate. In addition, the throughput of an individual ONT 57 may be limited, such as a 100 Mbps interface. Consequently, an individual ONT 57 can be overrun when receiving unique packet stream 50 and common packet stream 52 exceeds the bandwidth capacity of the individual ONT 57.

Admission control modules 58 employ the traffic management techniques described herein to prevent ONTs 57 from overflowing. In this example, OLT module 41 sends a unique packet stream 50 and common packet stream to an individual ONT 57. Accordingly, the admission control module associated with individual ONT 57 may be referred to as admission control module 58 in the following description, and in such cases, "admission control module 58" refers to any one of admission control modules 58. Since the throughput of an individual ONT 57 is limited, admission control module 58 of the individual ONT 57 prevents ONT 57 from being overrun by selectively admitting and denying access to common packet stream 52. In operation, the individual ONT 57 receives unique packet stream 50. The unique packet stream may be received at a default transmission rate. In any case, the individual ONT 57 may then select common packet stream 52 in response to receiving an IGMPv2 join request from the connected subscriber devices 59, as previously described. Next, admission control module 58 determines if receiving common packet stream 52 while simultaneously receiving unique packet stream 50 would collectively exceed the bandwidth capacity of the individual ONT 57.

Admission control module 58 may determine if receiving unique and common packet streams 50 and 52 would overrun the individual ONT 28 by processing the multicast packets. First, admission control module 58 determines the bandwidth requirement of common packet stream 52. For example, admission control module 58 may refer to a bandwidth map associated with common packet stream 52 to determine the bandwidth requirement of common packet stream 52. When a bandwidth map is not established for common packet stream 52, bandwidth determination module 44 may determine the bandwidth requirement of common packet stream 52 and communicate the requirement to multicast queue 42 to provision common packet stream 52 with a bandwidth map.

Admission control module 58 may then determine if receiving unique packet stream 50 and common packet stream 52 would exceed the bandwidth capacity of the individual ONT 57 by comparing the bandwidth requirement of common packet stream 52 to the available bandwidth capacity of the individual ONT 57. Alternatively, admission control module 58 may sum the bandwidth requirement of common packet stream 52 and unique packet stream 50 and compare the result to the total bandwidth capacity of the individual ONT 28. In any case, admission control module 58 may selectively permit or deny access to common packet 52 stream based on the determination.

For example, when accessing common packet stream 52 would not exceed the bandwidth capacity of the individual ONT 57, admission control module 57 may simply access common packet stream 52. Thus, individual ONT 57 receives common packet stream 52 and unique packet stream 50 without being overrun. However, when accessing common packet stream 52 would exceed the bandwidth requirement of the individual ONT 57, admission control module 58 may further determine if receiving unique packet stream 50 at a reduced transmission rate and receiving common packet stream 52 would still exceed the bandwidth requirement.

Accordingly, admission control module 58 may send a request to metering module 46 to reduce the transmission rate of unique packet stream 50 when receiving unique packet stream 50 at a reduced transmission rate and common packet stream 52 would not exceed the bandwidth capacity of the individual ONT 28, as previously described. In particular, the corresponding metering module 46 may reduce the transmission rate of unique packet stream 50 in response to receiving a request from admission control module 58 via the appropriate out of band control channel 54. However, unique packet stream 50 may have a minimum transmission rate.

Again, the transmission rate of unique packet stream 50 should not fall below a given minimum transmission rate. The minimum transmission rate may be determined based on the rate necessary to avoid undesirable latency, e.g., for voice communication. If the transmission rate of unique packet stream 50 must be reduced below the minimum transmission rate in order to prevent the individual ONT 57 from overflowing, admission control module 58 denies ONT 57 access to common packet stream 52. Since common packet stream 52 is not accessed, the transmission rate of unique packet stream 50 is not reduced and a request is not sent to metering module 46.

Otherwise, receiving unique packet stream 50 at a reduced transmission rate and common packet stream 52 may still exceed the bandwidth capacity of the individual ONT 57. Accordingly, admission control module 58 denies access to common packet stream 52 while the individual ONT 57 continues to receive unique packet stream 50. Again, the transmission rate of unique packet stream 50 is not reduced. In this manner, ONTs 57 maintain the ability to forward received packets to subscriber devices 59 by selectively accepting or denying common packet stream 52 based on the combined bandwidth requirement of common packet stream 52 and unique packet stream 50.

Figure 4:
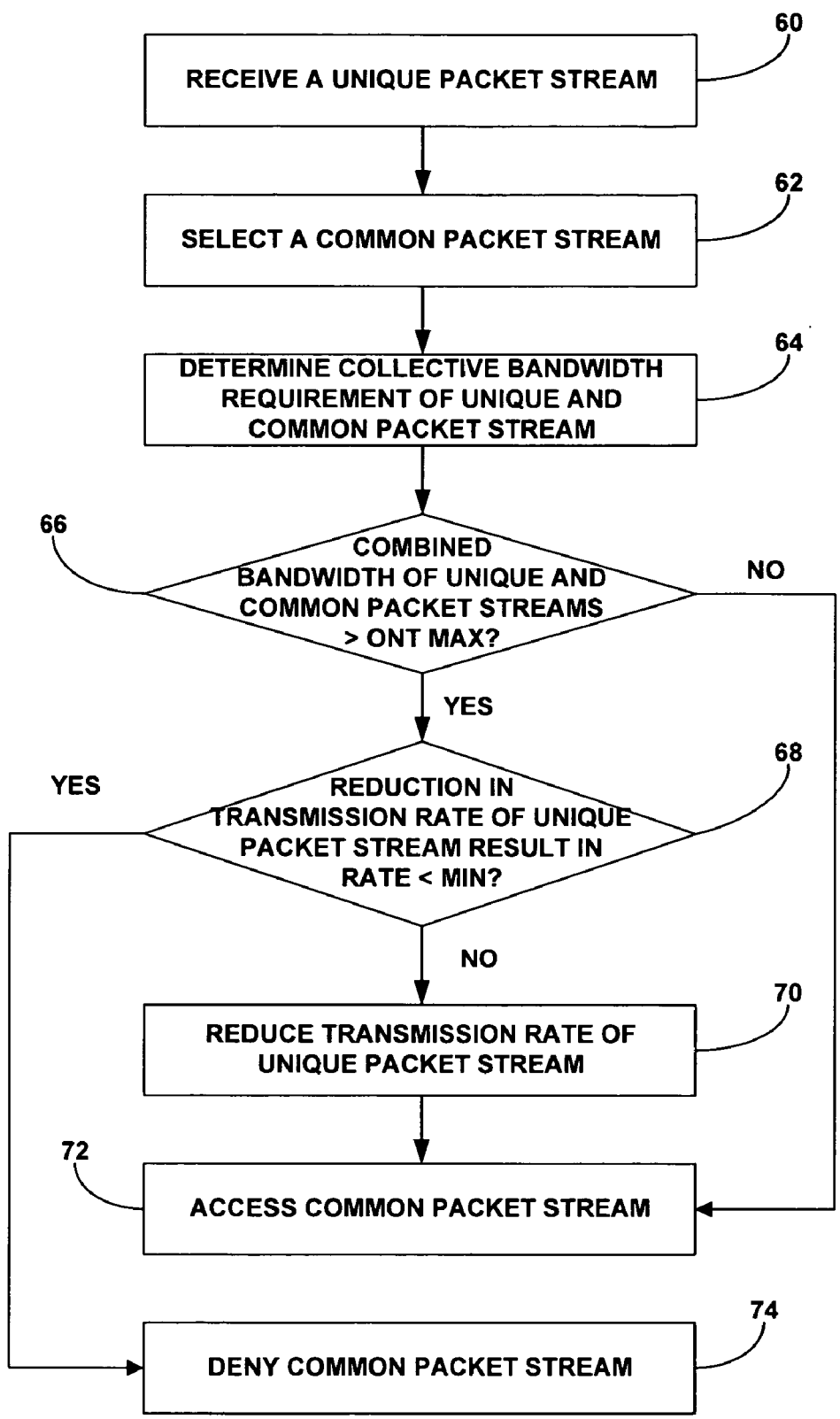
FIG. 4 is a flow diagram illustrating a traffic management technique suitable for an optical network terminal (ONT) on the PON in accordance with an embodiment of the invention.

FIG. 4 is a flow diagram illustrating a traffic management technique in accordance with an embodiment of the invention as viewed from an individual ONT 57. Initially, the individual ONT 57 receives a unique packet stream 50 (60) from an ISP queue 48. Next, the individual ONT 57 selects common packet stream 52 (62) from multicast queue 42 by examining the multicast group destination address associated with common packet stream 52, as previously described. Common packet stream 52 may, for example, comprise a pay-per-view television event, a real-time audio broadcast, or real-time information provided via the Internet such as stock prices or weather conditions. The individual ONT 57 then determines the bandwidth requirement of unique packet stream 50 and common packet stream 52 (64). In particular, bandwidth determination module 44 associates a bandwidth map with selected common packet stream 52. The individual ONT 57 may then determine the bandwidth requirement of common packet stream 52 by referring to the bandwidth map. The bandwidth requirement of unique packet stream 50 may be determined by reference to a control packet associated with unique packet stream 50.

The individual ONT 57 then determines if the combined bandwidth requirement of unique packet stream 50 and selected common packet stream 52 does not exceed a maximum bandwidth capacity (ONT MAX) of ONT 57 (66). When the combined bandwidth requirement of unique packet stream 50 and common packet stream 52 do not exceed the maximum bandwidth capacity, ONT 57 accesses common packet stream 52 (72). Accordingly, the individual ONT 57 receives unique packet stream 50 and common packet stream 52 without being overrun.

However, when the combined bandwidth requirement of unique packet stream 50 and selected common packet stream 52 exceed ONT MAX, the individual ONT 57 determines if a reduction in the transmission rate of unique packet stream 50 to provide sufficient to meet the requirement results in a drop below a pre-selected minimum transmission rate (ONT MIN) (68). If the transmission rate of unique packet stream 50 must be reduced by an amount that drops the transmission rate below the minimum rate in order to release sufficient bandwidth to accommodate common packet stream 52 without overflowing individual ONT 57, individual ONT 57 denies access to common packet stream 52 (74). On the other hand, when the transmission rate of unique packet stream 50 can be reduced without dropping below the minimum transmission rate to release sufficient bandwidth for common packet stream 50, OLT module 41 reduces the transmission rate of unique packet stream (70). In particular, the individual ONT 57 sends a request via an out of band control channel 54 to OLT module 41 to reduce the transmission rate of unique packet stream 50 by a proportionate amount. After reducing the transmission rate of unique packet stream 50, individual ONT 57 accesses common packet stream 52 (72). In this manner, the permitted reduction in the transmission rate of unique packet stream 50 allows the individual ONT 57 to receive common packet stream 52 with a fixed transmission rate without being overrun.

Figure 5:
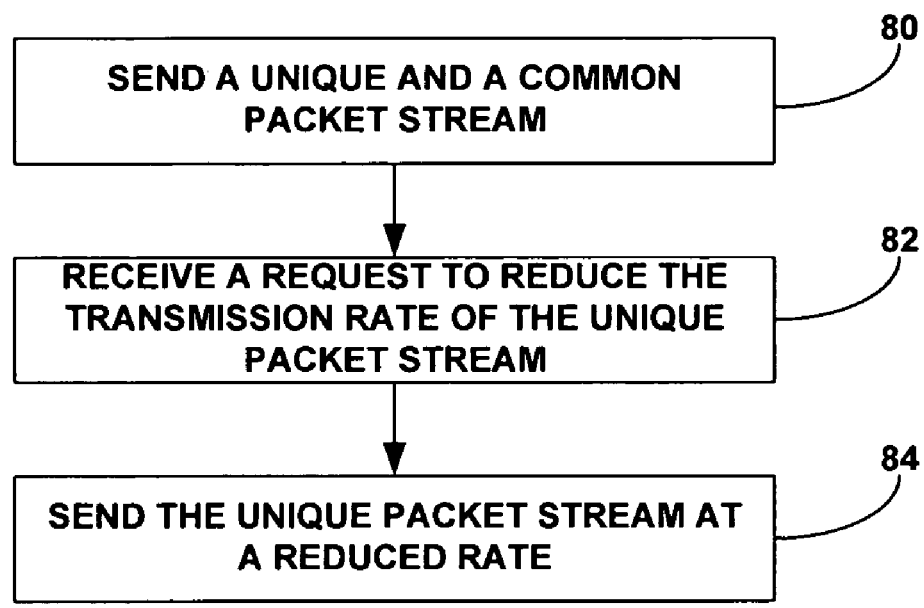
FIG. 5 is a flow diagram illustrating a traffic management technique suitable for an optical line terminal (OLT) in accordance with an embodiment of the invention.

FIG. 5 is a flow diagram illustrating a traffic management technique a traffic management technique in accordance with an embodiment of the invention as viewed from OLT module 41. Initially, OLT module 41 sends unique packet stream 50 and common packet stream 52 to an individual ONT 57 (80). In general, common packet stream 52 is sent to each of ONTs 57 since PON 10 is an inherently downstream multicast medium while unique packet stream 52 is sent only to the individual ONT 57. OLT module 41 may then receive a request to reduce the transmission rate of unique packet stream 50 (82). The request may specify the reduced rate at which to send unique packet stream 50. Upon receiving the request, OLT module 41 sends the unique packet stream at a reduced rate (84).

Figure 6:
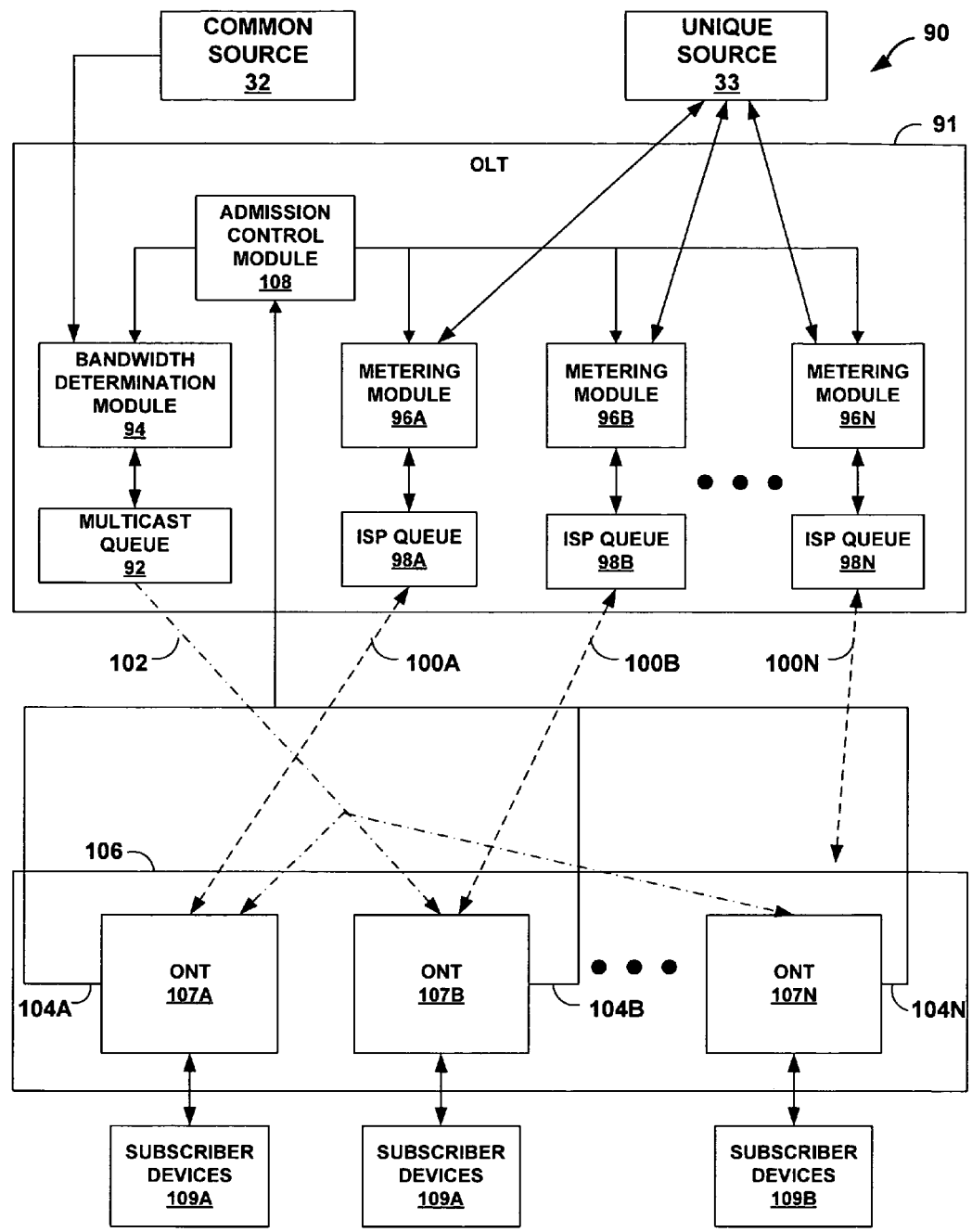
FIG. 6 is a block diagram illustrating an exemplary PON for implementing the traffic management techniques in accordance with an alternative embodiment of the invention.

FIG. 6 is a block diagram illustrating a single OLT module 91 on a PON 90 that delivers unicast and multicast traffic to a group 106 of ONTs 107A-107N (collectively "ONTs 107") in accordance with an alternative embodiment of the described traffic management techniques. Similar to PON 40 of FIG. 3, PON 90 includes only OLT module 91 for purposes of illustration, although PON 90 may also include additional OLT modules arranged in a common chassis. However, in contrast to PON 40 of FIG. 3, the traffic management techniques are implemented in OLT module 91 rather than in each of ONTs 107. Thus, as shown in FIG. 6, OLT module 91 includes admission control module 108 that generally implements the described traffic management techniques to prevent ONTs 107 from being overrun.

In general, OLT module 91 may receive multicast and unicast traffic from common source 32 and unique source 33, respectively, and deliver the multicast and unicast traffic to group 106 of ONTs 107 as common packet stream 102 and unique packet streams 100A-100N (collectively "unique packet stream 100"). Common packet stream 102 is shown as a dashed-and-dotted line while unique packet streams 100 are shown as dashed lines. Each of ONTs 107 are coupled to subscriber devices 109A-109N (collectively "subscriber devices 109"), respectively. In the following description an individual ONT may be referred to as ONT 107, and in such cases, "ONT 107" refers to any one of ONTs 107A-107N. Additionally, OLT module 91 includes a multicast queue 92 and a bandwidth determination module 104 as well as ISP queues 108A-108N (collectively "ISP queues 108") for each of ONTs 107, respectively.

In this example, common source 32 sends a stream of multicast packets to multicast queue 92, multicast queue 92 forms the multicast packets into common packet stream 102 and delivers common packet stream 102 to each of ONTs 107, and each ONT 107 examines the multicast group destination address included in the header of each packet to select the packets associated with the multicast group to which it belongs, as previously described with respect to FIG. 3. Multicast queue 92 may send the common packet stream 102 at a fixed transmission rate and ONTs 107 may use an IGMPv2 join request to request membership to a particular membership group. Thus, OLT module 91 delivers multicast traffic to ONTs 107 in a manner similar to that described with respect to FIG. 3. However, since OLT module 91 includes admission control module 108 which employs the traffic management techniques described herein, bandwidth determination module 94 may not communicate with multicast queue 92 in the illustrated example because the bandwidth map may not be periodically sent to ONTs 107. Rather, bandwidth determination module 94 may store the bandwidth map that includes the bandwidth for each common packet stream that may be received by ONTs 107. Consequently, admission control module 108 may communicate with bandwidth determination module 94 to determine the transmission rate of common packet stream 102.

Additionally, a flow meter may be implemented as a software function in bandwidth determination module 94 to establish a flow rate or bandwidth requirement of common packet stream 102 when the bandwidth map is not already established for common packet stream 102. Thus, bandwidth determination module 94 may determine the bandwidth requirement of common packet stream 102 and communicate the bandwidth requirement to admission control module 108. Thus, upon interrogating an IGMPv2 join request received from an ONT 107, admission control module 108 can determine the bandwidth requirement of common packet stream 102. As a result, admission control module can then selectively permit or deny the ONT 107 access to common packet stream in accordance with a predetermined admission policy, which has been described in detail, i.e., deny access to common packet stream 102, establish common packet stream 102, or establish common packet stream 102 but reduce the transmission rate of unique packet stream 100 by an appropriate amount.

OLT module 91 may also transmit unique packet stream 100 to ONTs 107 as previously described with respect to FIG. 3. Accordingly, unique source 33 sends streams of unicast packets to ISP queues 108 as multiple IP unicast packets identified by a standard IP address and ISP queues 108 form the unicast packets into unique packet streams 100, each unique packet stream including a unique MAC address that identifies a particular station of subscriber devices 109 connected to an individual ONT 107. In this example, ISP queues 108 transmit web content to ONTs 107, however, OLT module 91 may also include one or more service queues to transmit unique packet streams carrying other unicast data, such as voice data from a PSTN, to ONTs 107.

Metering modules 106 communicate with respective ISP queues 108 to meter the rate at which ISP queues 108 transmit unique packet stream 100. More specifically, admission control module 108 may communicate with a metering module 106 to reduce the transmission rate of a unique packet stream 100 in response to receiving a request for common packet stream 102. ONTs 107 may send a request for common packet stream via out of band control channels 104A-104N (collectively "out of band control channels 104"). Out of band control channels 104 are shown in solid lines.

In operation, each of ONTs 107 receives a unique packet stream 100 from ISP queue 98 and may also receive common packet stream 102 from multicast queue 92, however, an individual ONT 107 may generally receive any number of unique and common packet streams provided the individual ONT 107 can accommodate the streams without being overrun. In any case, multicast queue 92 sends common packet stream to each of ONTs 107 at a fixed rate. In addition, the throughput of an individual ONT 107 may be limited, such as a 100 Mbps interface. Consequently, an individual ONT 107 can be overrun when receiving unique packet stream 100 and common packet stream 102 exceeds the bandwidth capacity of the individual ONT 107. Since the throughput of an individual ONT 107 is limited, admission control module 108 prevents ONTs 107 from being overrun by selectively permitting and denying access to common packet stream 52 while ONTs 107 receive unique packet streams 100.

In the illustrated example, OLT module 91 sends a unique packet stream 100 to an individual ONT 107, receives a request, for example, an IGMPv2 join request, to access common packet stream 102 from the individual ONT 107, and selectively permits or denies access to common packet stream 52 in accordance with a predetermined admission policy. More specifically, ONT 107 may send a request to receive common packet stream 102 while concurrently receiving unique packet stream 102 at a default fixed transmission rate. Next, upon receiving the request, admission control module 108 determines if receiving common packet stream 52 while simultaneously receiving unique packet stream 100 would collectively exceed the bandwidth capacity of the individual ONT 107. Admission control module 108 may determine if receiving packet streams 100 and 102 would overrun the individual ONT 107 by interrogating the IGMPv2 request. For example, admission control module 108 may interrogate the IGMPv2 join request to determine the particular common packet stream that the individual ONT 107 has requested to receive, the available bandwidth capacity of the individual ONT 107, and the bandwidth of unique packet stream 100 that the individual ONT 107 is currently receiving. In particular, admission control module 108 may communicate with bandwidth determination module 94 to determine the bandwidth requirement of common packet stream 102 or, alternatively, bandwidth determination module 94 may associate a flow meter with common packet stream to determine the bandwidth requirement of common packet stream 102.

Admission control module 108 may then determine if receiving unique packet stream 100 and common packet stream 102 would exceed the bandwidth capacity of the individual ONT 107 using the techniques described previously, i.e., by comparing the bandwidth requirement of common packet stream to the available bandwidth capacity of the individual ONT 107 or by summing the bandwidth requirement of streams 100 and 102 and comparing the result to the total bandwidth capacity of the individual ONT 107. In any case, admission control module 108 may selectively permit or deny access to common packet stream 102 in accordance with the predetermined admission policy. Consequently, ONTs 107 simply send a request to receive common packet stream 102 and admission control module 108 may deny access to common packet stream 102, establish common packet stream 102, or establish common packet stream 102 but reduce the transmission rate of unique packet stream 100 by an appropriate amount. Thus, admission control module 108 prevents ONTs 107 from being overrun thereby maintaining their ability to forward received packets to subscriber devices 109.

Figure 7:
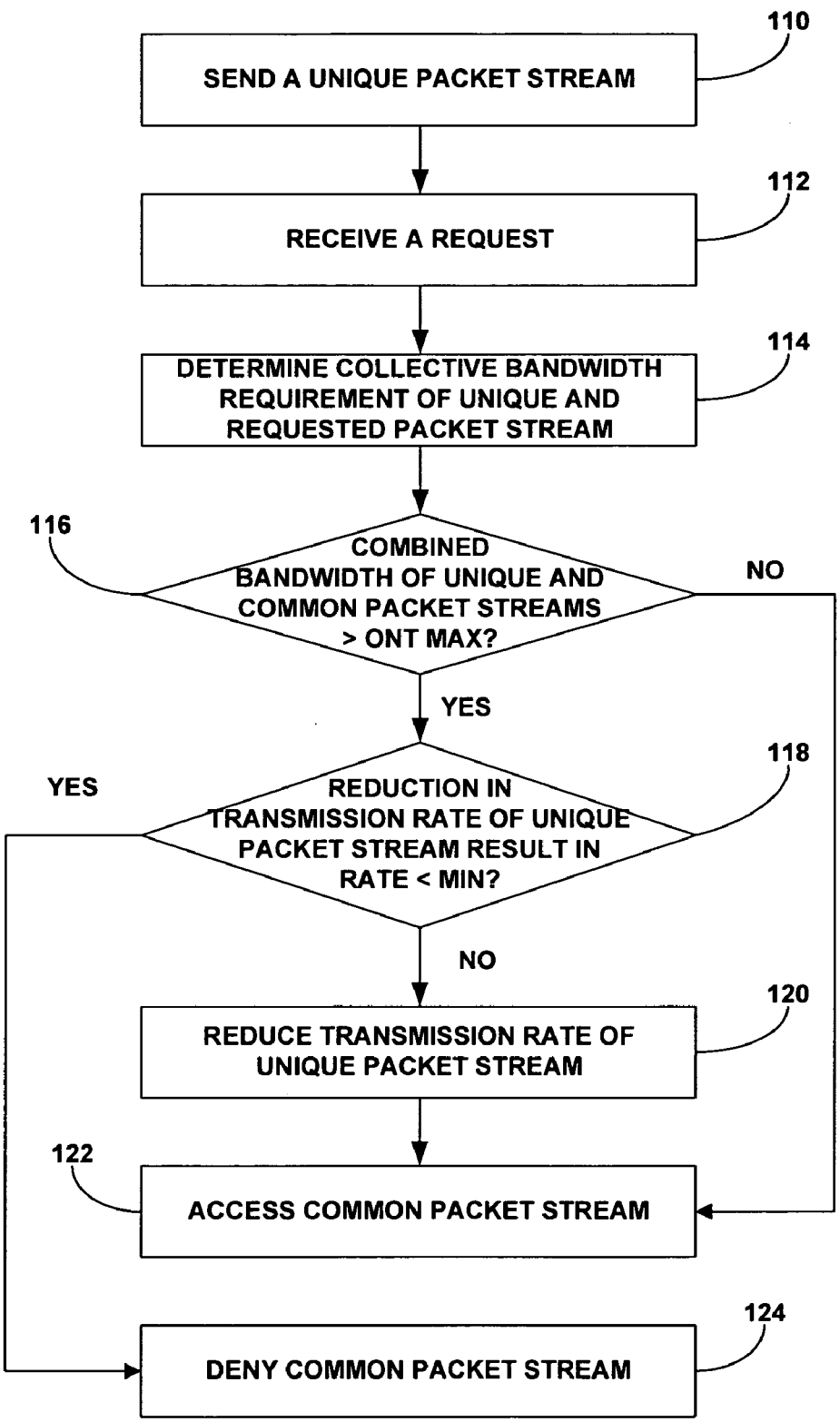
FIG. 7 is a flow diagram illustrating a traffic management technique suitable for an OLT on the PON in accordance with an alternative embodiment of the invention.

FIG. 7 is a flow diagram illustrating a traffic management technique in accordance with an alternative embodiment of the invention as viewed from OLT module 91. Initially, an ISP queue 98 of OLT module 91 sends a unique packet stream 100 (110) to an individual ONT 107. Next, OLT module 91 or, more particularly, admission control module 108 receives a request (112), such as an IGMPv2 join request, from the individual ONT 107 to receive common packet stream 102. The individual ONT 107 may send the request via an out of band control channel 104. Admission control module 108 then determines the bandwidth requirement of unique packet stream 100 and common packet stream 102 (114). As an example, admission control module 108 may determine the bandwidth requirement of common packet stream 102 by interrogating the IGMPv2 join request to determine which common packet stream has been requested. Admission control module 108 may then communicate with bandwidth determination module 94 to determine the bandwidth requirement of common packet stream 102. Bandwidth determination module 94 may refer to a bandwidth map or associated a flow meter with common packet stream 102 to determine the bandwidth requirement.

In any case, admission control module 108 then determines if the combined bandwidth requirement of unique packet stream 100 and requested common packet stream 102 exceeds a maximum bandwidth capacity (ONT MAX) of ONT 107 (116). When the combined bandwidth requirement of unique packet stream 100 and common packet stream 102 do not exceed the maximum bandwidth capacity, admission control module 107 allows ONT 107 to access common packet stream 102 (122). More specifically, admission control module 108 associates ONT 107 with the multicast group destination address for common packet stream 102. As a result, ONT 107 may access and receive common packet stream 102 as well as unique packet stream 100 without being overrun.

However, when admission control module 108 determines that the combined bandwidth requirement of unique packet stream 100 and common packet stream 102 exceed ONT MAX, the admission control module determines if a reduction in the transmission rate of unique packet stream 100 by an appropriate amount results in a combined bandwidth requirement less than a pre-selected minimum transmission rate (ONT MIN) (118). Reducing the transmission rate by an appropriate amount requires releasing sufficient bandwidth to accommodate unique packet stream 100 and common packet stream 102 without overflowing the individual ONT 107. If the transmission rate of unique packet stream 100 must be reduced by an amount that drops the transmission rate below the minimum transmission rate, admission control module 108 denies access to common packet stream 100 (124). Otherwise, when the transmission rate of unique packet stream 100 can be reduced without dropping below the minimum transmission rate, admission control module 108 reduces the transmission rate of unique packet stream 100 (120). In particular, admission control module 108 communicates with the appropriate ISP queue 98 to reduce the transmission rate of unique packet stream 100 by a proportionate amount. After reducing the transmission rate of unique packet stream 100, admission control module 108 permits the individual ONT 107 to access common packet stream 102 (122). Again, admission control module may permit the individual ONT 107 to access common packet stream 102 by associating the individual ONT 107 with the multicast group destination address for common packet stream 102. In this manner, the permitted reduction in the transmission rate of unique packet stream 100 prevents the individual ONT 107 from being overrun.

Figure 8:
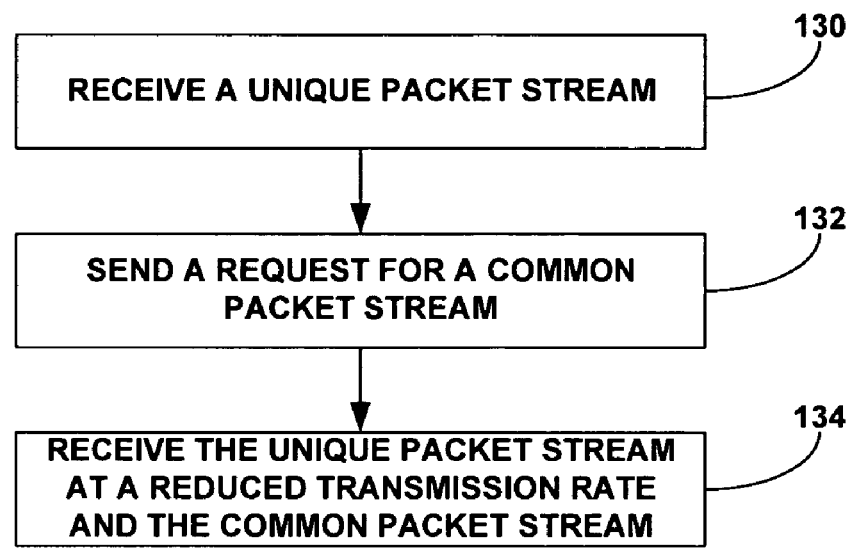
FIG. 8 is a flow diagram illustrating a traffic management technique suitable for an ONT on the PON in accordance with an alternative embodiment of the invention.

FIG. 8 is a flow diagram illustrating a traffic management technique in accordance with an alternative embodiment of the invention as viewed from an individual ONT 107. Initially, the individual ONT 107 receives unique packet stream 100 (130) from OLT module 91. The individual ONT 107 may then send a request (132) to OLT module 91 to receive common packet stream 102. Generally, common packet stream 102 is sent to each of ONTs 107 since PON 40 is an inherently downstream multicast medium, while unique packet stream 100 is sent only to an individual ONT 107. The individual ONT 107 may send a request, such as an IGMPv2 join request, via an out of band control channel 104, however, OLT module 91 selectively permits or denies the individual ONT 107 access to common packet stream 102 in accordance with a predetermined admission policy, as previously described. In this example, the individual ONT 107 receives unique packet stream 100 at a reduced transmission rate and common packet stream 102 (134).

Various hardware components described herein may include one or more processors, e.g. one or more microprocessors, digital signal processors (DSPs), application specific integrated circuits (ASICs), field-programmable gate arrays (FPGAs), or other programmable logic circuitry. In addition, in some cases, such components may execute program instructions stored within computer-readable media that cause them to perform the functions ascribed to them herein. Consequently, some embodiments take the form of computer-readable medium comprising instructions that cause a programmable processor to perform various functions described herein. A computer-readable medium may be any electronic, magnetic, or optical medium, such as a random access memory (RAM), read-only memory (ROM), CD-ROM, hard or floppy magnetic disk, electronically erasable and programmable ROM (EEPROM), flash memory, or the like.

Various embodiments of the invention have been described. However, one skilled in the art will appreciate that various modifications or additions may be made to the described embodiments without departing from the scope of the claimed invention. Although described in the context of PONs, the invention may be applicable to network nodes other than ONTs in other network environments. These and other embodiments are within the scope of the following claims.

The invention claimed is:

1. A method comprising:
sending a first packet stream over a passive optical network (PON), the first packet stream being addressed to a specific optical network terminal (ONT) on the PON;
receiving a request from the specific ONT to receive a second packet stream;
determining whether the first packet stream and the second packet stream would collectively exceed a bandwidth capacity of the specific ONT;
when the first packet stream and the second packet stream would collectively exceed the bandwidth capacity of the specific ONT, reducing a transmission rate associated with the first packet stream and allowing the specific ONT access to the second packet stream when the first packet stream at a reduced transmission rate and the second packet stream would not collectively exceed the bandwidth capacity of the specific ONT; and
when the first packet stream and the second packet stream would collectively exceed the bandwidth capacity of the specific ONT, denying the specific ONT access to the second packet stream when the first packet stream at the reduced transmission rate and the second packet stream would collectively exceed the bandwidth capacity of the specific ONT.

2. The method of claim 1, further comprising sending the first packet stream at a reduced transmission rate and sending the second packet stream in response to receiving the request.

3. The method of claim 1, wherein the first packet stream comprises a stream of unicast packets and the second packet stream comprises a stream of multicast packets.

4. The method of claim 1, wherein reducing the transmission rate of the first packet stream does not result in reducing the transmission rate below a pre-selected minimum transmission rate.

5. The method of claim 1, wherein determining whether the first packet stream and the second packet stream would collectively exceed the bandwidth capacity of the specific ONT comprises interrogating the request to determine the bandwidth requirement of the second packet stream.

6. The method of claim 1, wherein determining the first packet stream and the second packet stream would collectively exceed the bandwidth capacity of the specific ONT comprises referring to a bandwidth map to determine the bandwidth requirement of the second packet stream.

7. The method of claim 1, wherein the request comprises an internet group management protocol (IGMPv2) join request associated with the second packet stream.

8. The method of claim 1, wherein determining whether receiving the first packet stream and the second packet stream would collectively exceed the bandwidth requirement of the specific ONT comprises summing a bandwidth requirement of the first packet stream and a bandwidth requirement of the second packet stream and comparing the result to the bandwidth capacity of the specific ONT.

9. The method of claim 1, wherein allowing the specific ONT access to the second packet stream comprises associating the specific ONT with a multicast group destination address associated with the second packet stream.

10. The method of claim 1, wherein denying the specific ONT access to the second packet stream comprises not associating the specific ONT with a multicast group destination address associated with the second packet stream.

11. The method of claim 1, further comprising:
when the first packet stream and the second packet stream would not collectively exceed the bandwidth capacity of the specific ONT, allowing the ONT access to the second packet stream.

* * * * *

UNITED STATES PATENT AND TRADEMARK OFFICE
CERTIFICATE OF CORRECTION

| | | |
|---|---|---|
| PATENT NO. | : 7,848,343 B2 | |
| APPLICATION NO. | : 11/157438 | |
| DATED | : December 7, 2010 | |
| INVENTOR(S) | : Christopher D. Koch and David Cleary | |

It is certified that error appears in the above-identified patent and that said Letters Patent is hereby corrected as shown below:

On column 16, line 55, "EP" should read --IP--

Signed and Sealed this
Twenty-fourth Day of January, 2012

David J. Kappos
*Director of the United States Patent and Trademark Office*